Figure 4:
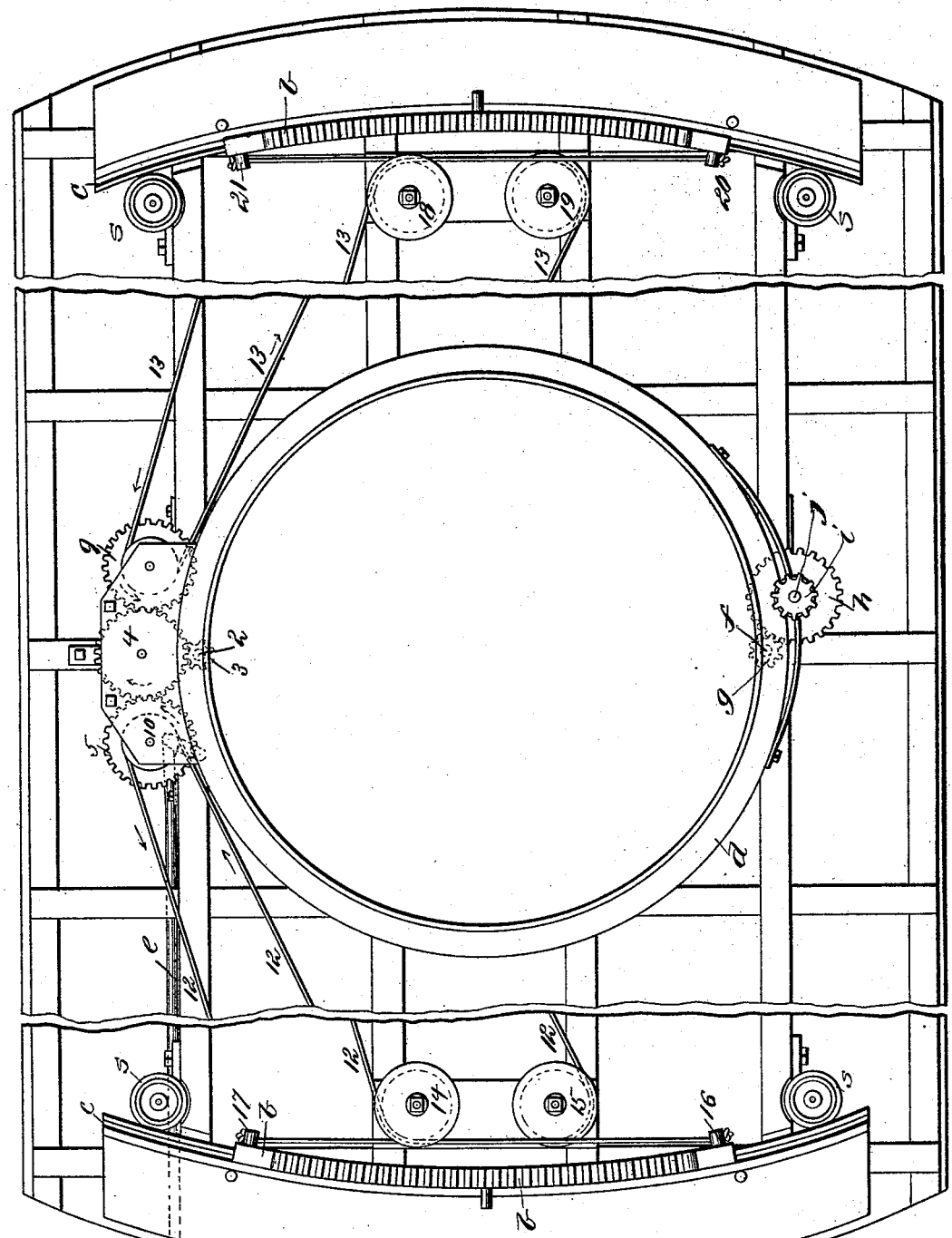

(No Model.) A. G. ANDERSON.
DRAWBRIDGE GATE.
No. 486,843. Patented Nov. 29, 1892.
5 Sheets—Sheet 1.
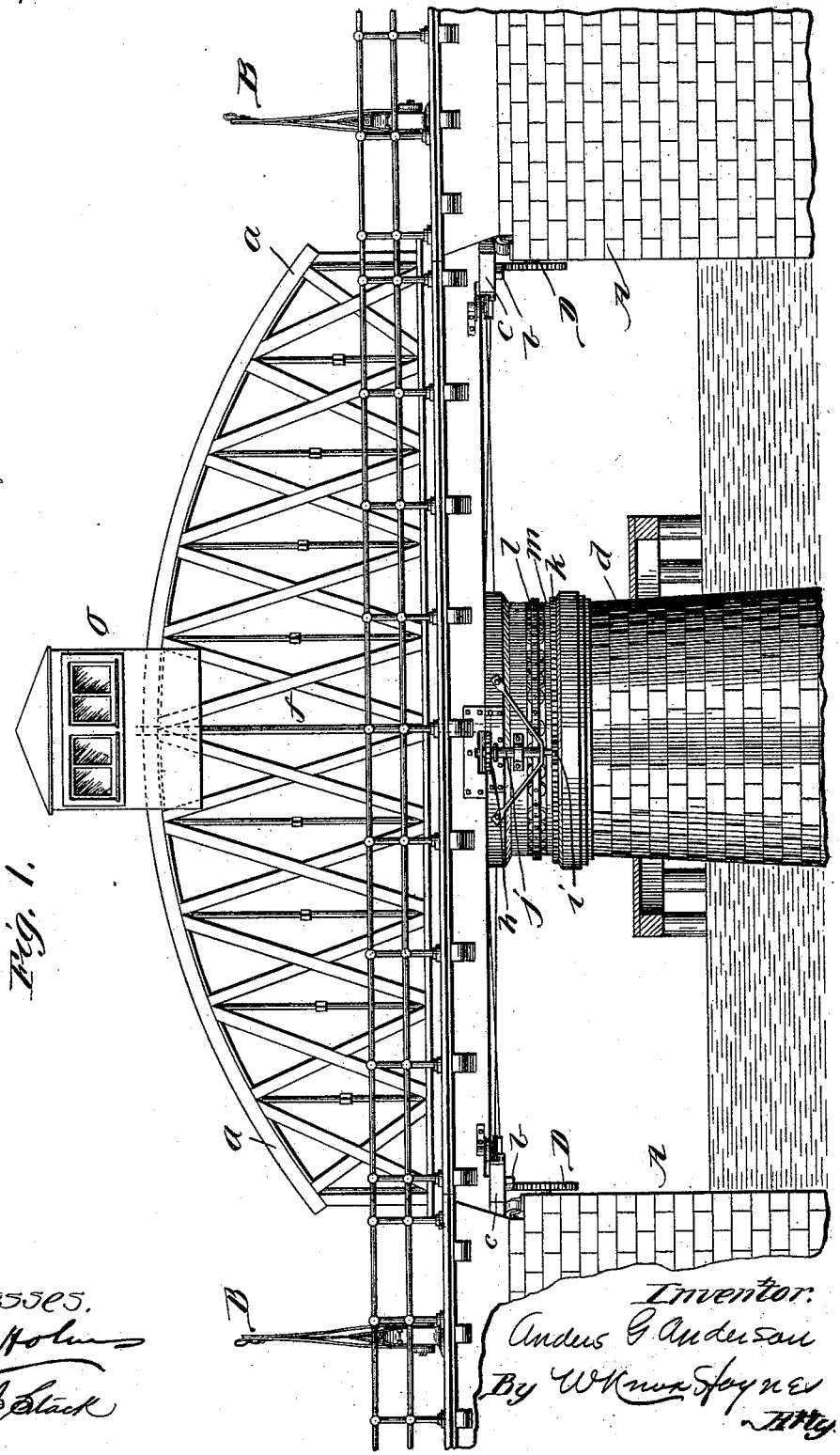

(No Model.) 5 Sheets—Sheet 2.
A. G. ANDERSON.
DRAWBRIDGE GATE.
No. 486,843. Patented Nov. 29, 1892.
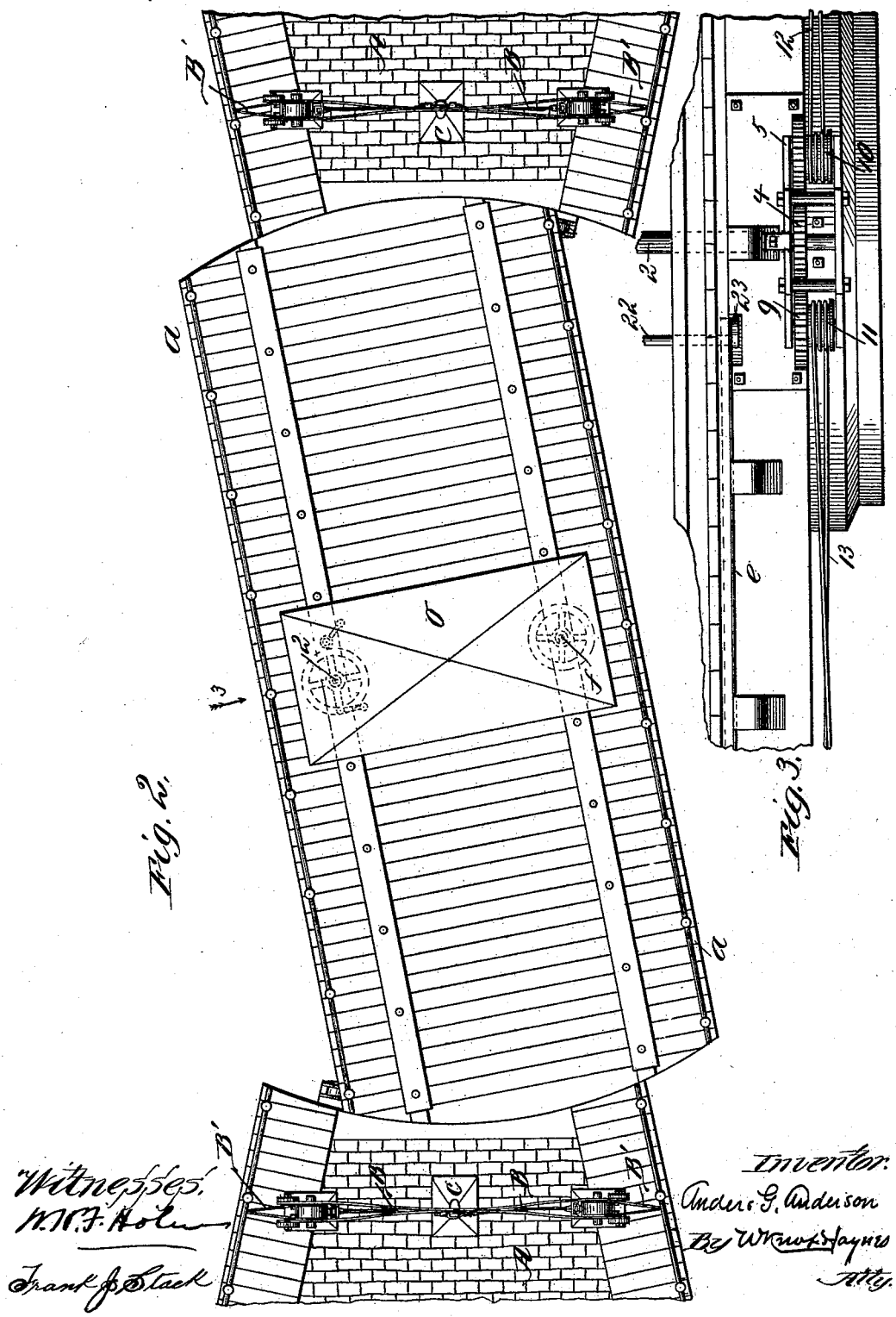

(No Model.) 5 Sheets—Sheet 3.

A. G. ANDERSON.
DRAWBRIDGE GATE.

No. 486,843. Patented Nov. 29, 1892.

Witnesses.
W. W. F. Holmes
Frank J. Black

Inventor:
Anders G. Anderson
By W. Knox Haynes
Atty.

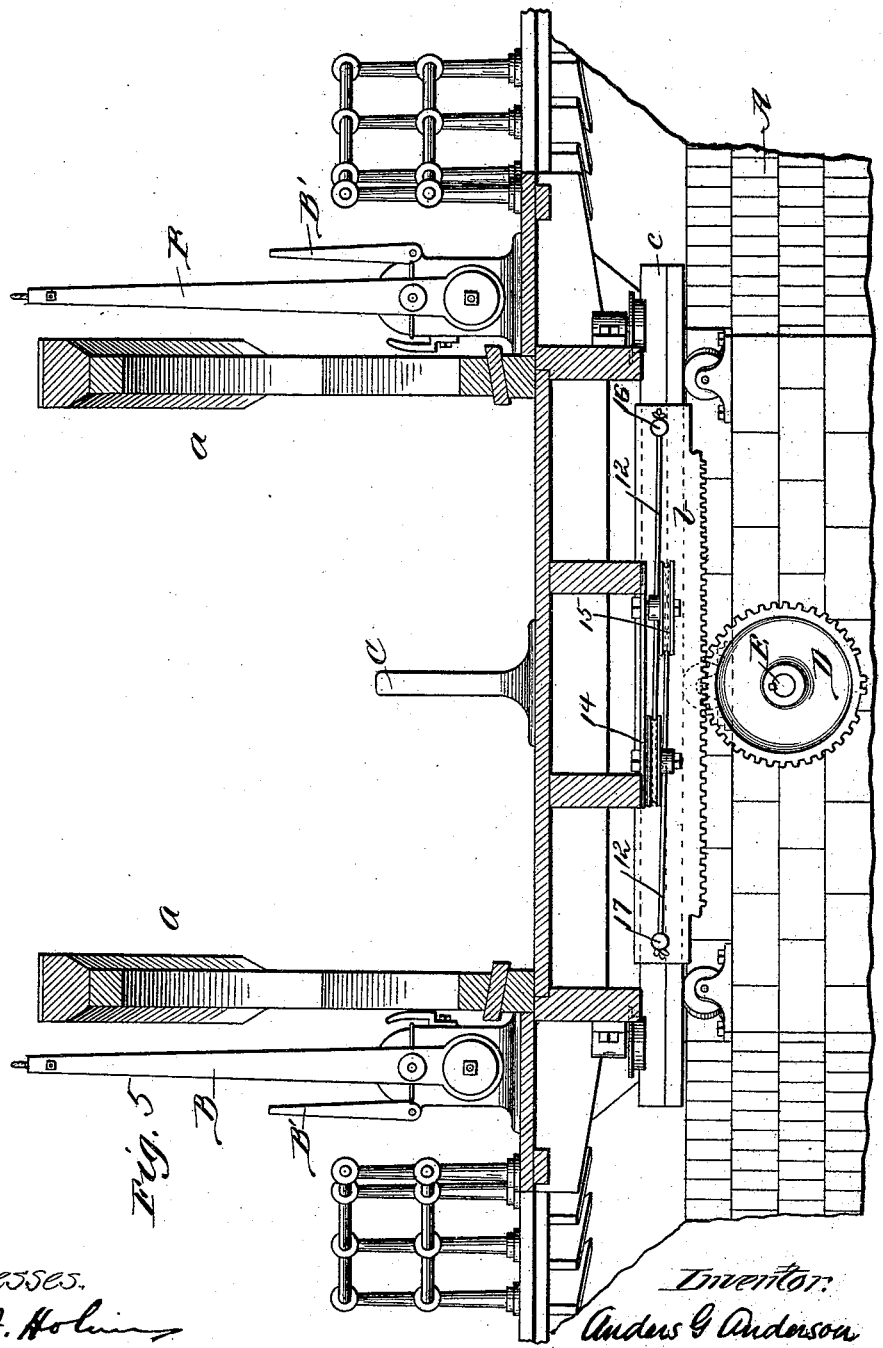

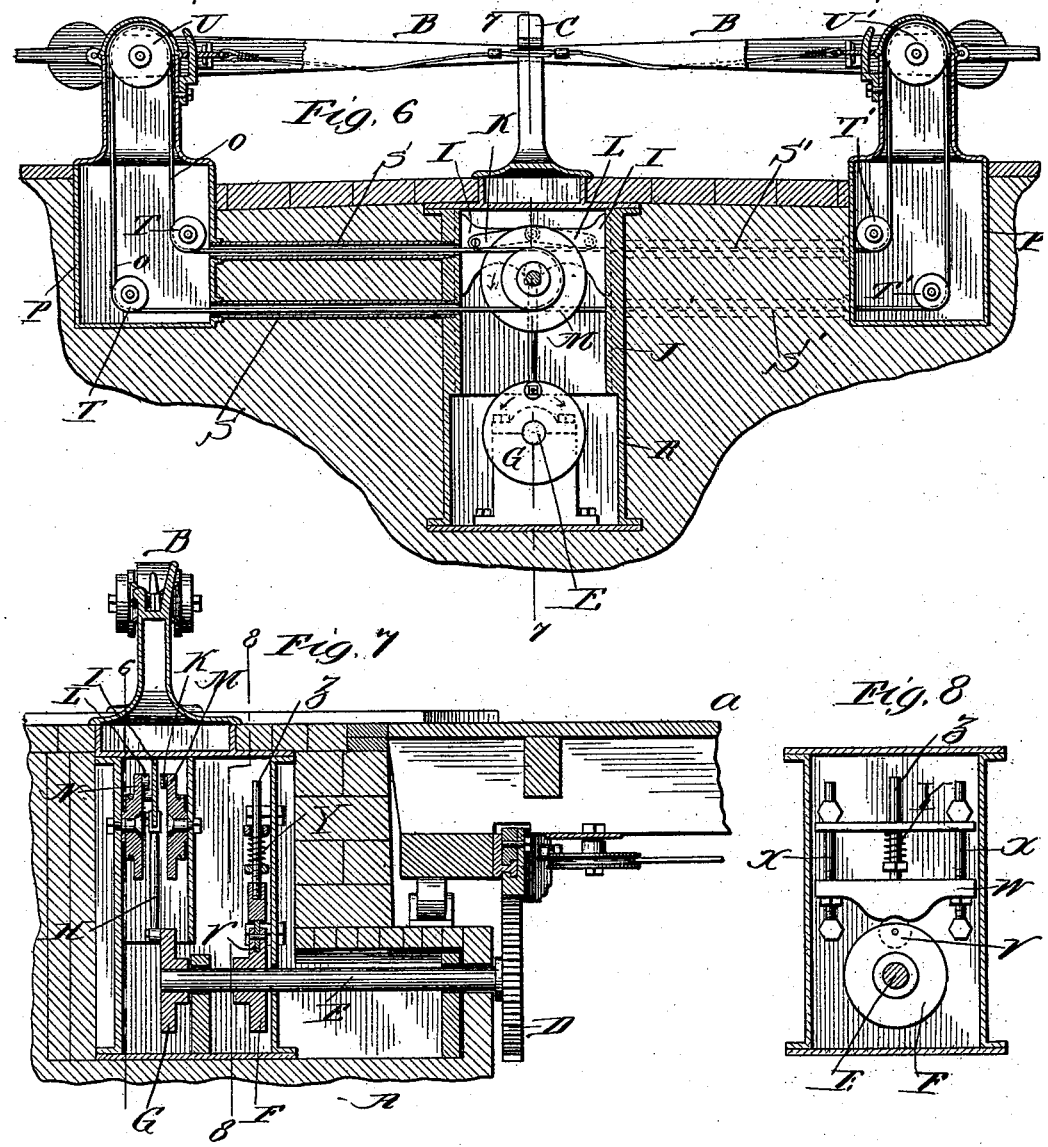

UNITED STATES PATENT OFFICE.

ANDERS GUSTAF ANDERSON, OF CHICAGO, ILLINOIS.

DRAWBRIDGE-GATE.

SPECIFICATION forming part of Letters Patent No. 486,843, dated November 29, 1892.

Application filed April 13, 1892. Serial No. 428,993. (No model.)

*To all whom it may concern:*

Be it known that I, ANDERS GUSTAF ANDERSON, a citizen of the United States, and a resident of the city of Chicago, in the county of Cook and State of Illinois, have invented a certain new and useful Mechanical Turning Bridge and Safety-Gates, the said bridge and gates combined embodying the subject of my invention, and of which I declare the following, in connection with the accompanying five sheets of drawings, to be an accurate and complete specification.

The invention relates to gates for drawbridges, which gates are designed to be operated automatically by the motion of the bridge when turned and to be subject to the control and operation of the bridge-tender, to the end that they may be raised or lowered from his station, which is usually in the center of the bridge, at any time the bridge is closed.

I attain the object of my invention by certain new and novel methods of construction, both in mechanism of the bridge and in construction and operating mechanism of the gates, which operate in combination with certain novel mechanical features of the bridge.

A more complete description of the construction, operation, and utility of my invention may be made by reference to the accompanying five sheets of drawings and the several figures thereon appearing.

In the several figures of said drawings, like letters of reference indicate like parts.

Figure 1 is a side elevation of the visible external portions of my invention, showing a drawbridge mounted upon its center pier and the abutments on the right and left, to which are affixed the finger-gates guarding the approach to the bridge, the gates upright and open and the bridge closed. Fig. 2 is a top plan of bridge, abutments, and gates. In this view the bridge is slightly swung or turned and the gates down and closed. This view is intended to show the distance which the bridge must necessarily swing to completely close the gates. Fig. 3 is a detached section of the bridge, showing certain gearing and cables by which the mechanism may be put in motion, whereby to operate the gates to open or close the same when the bridge is closed without moving the bridge. A more extensive and elaborate description of the mechanism in this figure shown will be hereinafter stated. Fig. 4 is a broken under plan of the bridge, being represented in this figure in three sections—viz., the two ends and that portion directly under the center pier, the intervening portions of the bridge between the center pier and the respective ends being omitted. Fig. 5 shows the abutment and gates and a transverse section of one end of the bridge at the abutment. Fig. 6 shows a vertical section of the abutment and the interior mechanism within said abutment by which the said gates are operated, looking toward the bridge. Fig. 7 is a transverse vertical section of the abutment and mechanism shown in Fig. 6, taken upon a line from figures 7 7, appearing upon Fig. 6. The relation of Fig. 6 to Fig. 7 is equivalent, also, to a transverse section of Fig. 7 upon the line 6 6 in Fig. 7. Fig. 8 is a face elevation of certain mechanism upon the right of the line 8 8 in Fig. 7.

For convenience in description the elements which enter into my invention may be divided into two groups: first, the mechanism in the abutment and directly attached to the gates, including the gates themselves; second, the peculiar mechanism attached to the bridge to co-operate with the mechanism of the first group.

I will here describe the first group of mechanism, which is more particularly shown in Figs. 6, 7, and 8. The several elements thereof are indicated principally by capital letters upon the drawings, and are as follows:

A A represent the several abutments. In plan shown in Fig. 2 the several abutments or approaches to the bridge show three separate passage-ways, one on either side, corresponding to the sidewalk, for foot-passengers, and the broader passage in the center, corresponding to the street, for the use of vehicles, horses, and other conveyances using the street proper. To properly guard this approach, I have shown upon said plan and upon other figures of the drawings two guard-gates for the center or street passage and two smaller guard-gates, one on either side, for the two passenger-walks. These gates are of the kind usually known as "finger-gates," consisting of a single bar, which when open stands in a vertical position and is closed by turning on a pivot at or near its lower end to a horizontal position, thus forming a bar across the passage-way. Gates of this kind and class generally are quite common and are adopted in my invention solely as an element in the combination. An upright support is placed on either side of the street, and to this the several gates are pivoted, and within this upright support is the mechanism for proximate application of power to operate said gates.

B B B B represent the four gates intended to guard the street-passage upon the several approaches.

B' B' B' B' represent the several shorter gates intended to guard the passenger-walks upon the several approaches. The gates B and B' are geared together by proper operation of gears in any usual common manner, so that their movements from vertical to horizontal, and vice versa, may co-operate and correspond, the gates B' falling outward from a vertical to a horizontal position across the several passenger-walks and the gates B falling inward from a vertical to a horizontal position, in which latter position their inner extremities meet and rest upon some suitable post or other resting-place placed in the center of the street, thus forming a complete bar across the street.

C upon the drawings represents an upright post in the center of the street approach, upon which the inner extremities of the gates B when closed to a horizontal position may rest.

D is a large gear placed upon a shaft. Its position upon the inner face of each abutment is more particularly shown in Fig. 5. A side view of said gear is also apparent in Fig. 7. A more particular description of this gear and its functions will be hereinafter made.

E is a shaft (upon which gear D is placed) and is the driving-shaft whereby the operating mechanism of the gates is operated. This shaft enters the face of the abutment at the position indicated and apparent in Fig. 5. It extends inward to engage and operate the driving mechanism of the gates, as is more particularly apparent in the transverse sectional view shown in Fig. 7. Said shaft passes inward, being firmly journaled at several points along its length, and has first attached thereto a friction-wheel and next attached thereto at its inner extremity a second wheel. Both are shown in section in Fig. 7.

F is the friction-wheel above referred to, the uses, purposes, and operation of which will be more particularly and fully described hereinafter.

G is the wheel at the inner extremity of shaft last above referred to, its position being shown in face elevation in Fig. 6 and in transverse section in Fig. 7.

H is a pitman-rod fixed near the circumferential line of wheel G, which wheel will herein be termed the "driving-wheel." A partial face elevation of pitman-rod H and its attachment to driving-wheel G is shown in Fig. 6, and side view thereof is shown in Fig. 7.

I is an irregular plate extending from side to side within the box or excavated space in the abutment in which this group of mechanism is placed, its respective ends entering vertical channels J J upon either side thereof, in which channels said plate may travel upward or downward. A partial face elevation of this plate is apparent in Fig. 6. A transverse section thereof is shown in Fig. 7. To the lower central portion of this plate the upper end of pitman-rod H is attached, so that the motion of this plate up or down is guided by channels J J and operated by the pitman-rod H.

J J are dotted lines (apparent in Fig. 6) representing the position of the vertical guiding-channels in which plate I may travel.

K is a metallic bar pivoted at its outer end upon the left and outer side of plate I, its inner end pivoted upon the inner side near the circumferential line of wheel M. A partial face elevation of bar K is apparent in Fig. 6. Its place and position at which it is pivoted to wheel M is indicated in said figure by dotted lines, which position is also shown in sectional Fig. 6.

L is a metallic bar similar in formation, utility, and application to bar K, last described, except that it is pivoted upon the inner right side of plate I and its other extremity pivoted to wheel N, which wheel is in rear of plate I. The position of bar L is indicated on Fig. 6 by dotted lines. The position at which it is pivoted to wheel N is also shown in Fig. 7.

M indicates a wheel, being the same last referred to, to which the inner extremity of bar K is pivoted, which wheel is journaled to a stout upright, and which wheel is turned down upon the side opposite to plate I to form a sheave, said sheave being about one-half of the extreme diameter of wheel M.

N indicates a wheel similar in structure to wheel M, last described, but reversed in position and placed in the rear of plate I. The position of wheel N is accurately shown in section in Fig. 7.

O represents a continuous cable or metallic belt, which passes over the sheave formed by wheel M, as hereinbefore described, and passes to the left through two horizontal conduits over guiding-sheaves T T, thence upward through the interior of the upright standard, to which gates are pivoted, passing over a sheave or driving-pulley within said standard.

P P represent metallic boxes within the body of the abutments directly underneath the upright standards, upon which gates are pivoted, which contain guiding-sheaves for the cable to pass over in traversing upward to engage the driving-sheaves, by which the gates are operated. These boxes will be constructed of metal, of wood, or of masonry, or of anything which will insure a clear passage for the cables and proper journal-bearings for the shafts carrying the driving-sheaves.

R is a metal box inclosing the aperture, in which the central group of mechanism is placed within the body of the abutment. This box or aperture may be constructed, like boxes P P, of metal, of wood, of masonry, or of any material which will provide a safe and clear operating space and proper journals for the operating mechanism therein contained. It is preferable, however, that the same shall be constructed of iron or other metal with suitable doors or openings, which may be removed in order that the machinery may be easily reached for the purpose of construction, oiling, or repairing.

S S are conduits above referred to upon the left, through which cable O may traverse. The position of these conduits is shown fully in Fig. 6.

S' S' are dotted lines, which indicate the position of the conduits on the right, substantially equivalent to the conduits S S upon the left, as shown in Fig. 6, through which latter conduits a cable similar to cable O may pass from the sheave constructed upon wheel N to the right over guiding-sheaves T' T' to operating-sheave in the upright standard upon the right.

T T are the guiding-sheaves hereinbefore referred to, to be placed in box P on the left, over which cable O passes in its course from sheave upon wheel M to the operating-sheave of the gate upon the left.

T' T' are similar guiding-sheaves upon the right. The position of the sheaves T' T' is plainly shown in Fig. 6 in the face elevation.

U is a driving-sheave in the upright standard upon the left, by which the gates attached to that standard are operated.

U' is a driving-sheave similar to driving-sheave U and is in the standard upon the right. The driving-sheaves U and U' are shown in face elevation in Fig. 6.

V is a small friction-pulley journaled in the circumference of wheel F and more particularly described in regard to its utility and functions hereinafter.

W is a bearer intended to engage friction-pulley V.

X X are upright spindles or guides upon which bearer W may travel upward or downward.

Y is a spiral spring exerting a downward energy upon bearer W.

Z is a spindle upon which spring Y is coiled and by which it is held in proper position.

I will now describe the operation of the group of mechanism the individual elements of which have been last described.

As hereinbefore stated, E is the driving-shaft, and the position of the shaft and mechanism governed thereby, as shown in Figs. 6 and 7, represents the position of the several elements with the gates down and closed. The revolutions of the shaft E in either direction operate wheel G and pitman H, drawing plate I downward, thereby revolving wheel M in the direction indicated by the arrow thereon, and at the same time, by connection of the arm L from the plate I to the wheel N, wheel N is simultaneously revolved in a direction opposite to that of the wheel M. The cable O, passing over sheave on wheel M and guiding-sheaves T T, engages driving-sheave U, revolving the same, and thereby raising the gates from a horizontal to a vertical position. The relations and proportions of wheel G, pitman H, plate I, arms K and L, and wheels M and N are such that a half-revolution in either direction of wheel G induces a quarter-revolution of wheels M and N. The sheaves upon the sides of wheels M and N correspond in diameter with the operating-sheaves U and U'. Therefore the half-revolution of wheel G ultimately causes a quarter-revolution of driving-sheaves U and U', whereby the gates B are forced from a horizontal to a vertical position, their extremities traversing an arc of ninety degrees. The wheel G having performed a half-revolution from the position shown in Figs. 6 and 7, the gates are thereby opened. The point of attachment of pitman H is then at the lowest point which it may reach. The plate I is drawn downward in the channels J J to its lowest point. The arms K and L are extended downward from this point, and the further revolution of shaft E and wheel G in the original direction or in a reverse direction must force pitman H, plate I, and the various connections thereto upward, thereby reversing the operation of the mechanism from that induced by the first half-revolution of wheel G, causing wheels M and N to reverse their motion, the several cables traversing from the sheaves upon wheels M and N to driving-sheaves U and U' to travel in an opposite direction from their last movements, and thereby force the gates downward from the vertical to the horizontal position. Thus it appears that every half-revolution of shaft E and wheel G from the position shown in Figs. 6 and 7 must force the gates upward from the horizontal to the vertical, and every half-revolution in either direction of shaft E and wheel G from the second position—i. e., the position with the gates open—must force the gates again downward from vertical to horizontal, and it is immaterial whether the shaft E revolves continuously in one direction or whether the direction of the revolution be reversed at every half-revolution, as continual opening and closing of the gates must follow the motion of the shaft E every complete revolution, therefore causing the gates to open and close. For safety and to prevent the possibility of the cables slipping upon the sheaves U and U' or upon the sheaves upon the wheels M and N the said cable may be arbitrarily attached at a single point upon each of these sheaves, this arbitrary attachment being possible for the reason that the sheaves perform only a quarter-revolution in each direction.

I will now describe certain mechanism attached to the bridge proper.

*a* is the bridge proper, and may be of common form or structure of swinging bridges.

*b* is a rack attached to each end of the swinging bridge, having a sufficient number of teeth to correspond with the number of teeth in driving-gear D and placed in position upon the end of the bridge to engage said gear D. Rack *b* is constructed so that it may slide from side to side upon a track.

*c* is a track or rail upon which rack *b* may slide from side to side. The position of rack *b* and rail *c* is shown in elevation in Fig. 5, and in the plan looking upward from the bottom in Fig. 4.

*d* is the center pier, upon which the bridge is suspended and swings, and is shown in Fig. 1.

*e* is a locking rod or bolt, which may be operated from the bridge-tender's station and intended at its extremity to shoot into a slide or receptacle into the pier to lock the bridge in position when closed, and is shown in Fig. 4, and its position indicated by dotted lines in Fig. 3.

*f* is an upright shaft extending from the bridge-tender's station at the top of the bridge, over the center pier, downward upon one side to the mechanism by which the bridge is turned. This shaft is shown in elevation in Fig. 1, and its position indicated by dotted lines in Figs. 2 and 3. It will be equipped at the top with a hand brake or wheel, as indicated in dotted lines in Fig. 2, or it may be attached to whatever form of motive power may be used in operation of the bridge. At or near its lower extremities is attached pinion *g*, the position of which is indicated by dotted lines in Fig. 4.

*h* is a large gear placed at or near the upper end of a short upright shaft and engages a pinion *g*. The position of gear *h* is shown in Figs. 1 and 4.

*i* is a small pinion placed at or near the lower end of the shaft upon which gear *h* is attached.

*j* is a short upright shaft carrying gear *h* and pinion *i*. The position of said shaft and pinion is shown in Figs. 1 and 4.

*k* is a circular rack extending horizontally around the upper portion of pier *d*, the teeth upon this rack corresponding to and engaging with the teeth of pinion *i*.

*l* is a continuous circular track placed at the bottom of the bridge *a* and resting upon circular rail *m* at the top of pier *d*, forming the circular roadway upon which the bridge turns upon the top of the center pier.

I will now describe the mechanism the several parts of which are indicated by the small or lower-case letters last mentioned.

The bridge being closed in the position shown in Fig. 1, a revolution of shaft *f* causes pinion *g* to engage gear *h*, shaft *j*, and pinion *i*. Pinion *i* in turn, engaging circular rack *k*, forces the bridge to move upon the track *l* around the circular track *m*, thus throwing the bridge open. This motion may be continued until the bridge stands at right angles to its position when closed, leaving the waterway open upon either side of pier *d*. To close the bridge, the same motion may be continued until the bridge has been swung around, or it may be reversed until the bridge is brought back to its original position.

I will now describe a third group of mechanism attached to the bridge.

2 is an upright shaft similar to shaft *f*, placed on the opposite side of the bridge from shaft *f*. A sectional portion of said shaft 2 is shown in Fig. 3, and the positions of its respective ends are shown by dotted lines in Figs. 2 and 4. The upper extremity of shaft 2 may be equipped with a hand brake or wheel, as indicated by dotted lines in Fig. 2, or it may be attached to the engine or other power used upon the bridge. At or near its lower extremity is a pinion.

3 is the pinion last mentioned. Its position is indicated by dotted lines upon Fig. 4 in the plan.

4 is a gear placed upon a short upright shaft its position being shown in Figs. 3 and 4 and which is engaged by pinion 3.

5 and 9 are gears placed upon upright shafts in position to engage and be operated by gear 4. The respective positions of gears 5 and 9 on the right and left of gear 4 is shown in the plan in Fig. 4 and in elevation in Fig. 3.

10 and 11 are drums fixed to and beneath gears 5 and 9, respectively, the position thereof being shown in plan in Fig. 4 and in elevation in Fig. 3.

12 and 13 are cables passing around the drums 10 and 11, respectively, and passing to the right and left to their connections, to be hereinafter described.

14 and 15 are sheaves engaged by the cable 12.

18 and 19 are sheaves engaged by cable 13.

16 and 17 represent the respective points upon rack *b* at which the respective ends of cable 12 are attached.

20 and 21 are the points upon the rack *b* at the other end of the bridge at which the respective ends of the cable 13 are attached.

The operation of the gates by which they are either opened or closed while the bridge is closed is accomplished by the co-operation of the elements of mechanism last described by numbers with the elements of mechanism upon the abutments first described by capital letters, the operation being as follows: The bridge being closed and the gates opened, the driving-gear D engaging rack *b* in the position shown in Fig. 5, and the rack *b* having the same number of teeth as the gear D, it is apparent that the movement of the rack *b* across a given point at the top of gear D will operate shaft E, thereby operating the mechanism in the abutment in the manner hereinbefore described, closing the gates by the first half-revolution and opening them by the second half-revolution of gear D, and that sliding the rack b to the right or left to its full extent from the position shown in Fig. 5 would induce a half-revolution of gear D, which would cause, through the mechanism already described in the abutment, the closing of the gates.

The operation of shaft by the bridge-tender in either direction causes pinion 3 to revolve, operating gear 4, which in turn engages and operates gears 5 and 9 and the respective drums 10 and 11, thereby operating the respective cables 12 and 13, which cables are attached in the manner hereinbefore described to the racks b at the respective ends of the bridge, whereby said racks are caused to traverse upon their respective rails c in opposite direction, thereby engaging the gears D upon each abutment and causing a half-revolution of said gears D and accomplishing through the mechanism in the abutment the closing of the gates B. A reversal of the operation of shaft 2 reverses the mechanism, the action of the cables, and slides racks b back to the position shown in Fig. 5, again opening the gates.

In ordinary cases the mechanism last described by numbers is locked by a ratchet or any common ordinary device, and the rack b thereby rigidly held in position, as shown in Figs. 4 and 5. The operation of turning the bridge either way, operating the racks b across the face of gear D, causing a half-revolution of said gear and shaft E, and accomplishing the closing of the gates by a movement of the bridge for a distance equivalent to one-half of the length of rack b. The top plan view shown in Fig. 2 indicates the distance which the bridge must necessarily turn in order to fully close the gates, the racks b being constructed in proportion shown in the drawings. The said racks may be slightly shortened and the gear D reduced in size, whereby the gates may be closed upon a correspondingly-less swing of the bridge. The gear D is constructed with this peculiarity upon its lower edge when in the position shown in Fig. 5. There is a group of two teeth, on either side of which is a blank space equivalent to the proportional circumference, upon which one tooth might be placed on either side. When the bridge is in the position apparent from Fig. 5, it is locked by bolt e, and danger of its swinging or moving out of position is thereby avoided. When the bridge is opened and the mechanism in position shown in Figs. 3 and 6, the gear D has performed a half-revolution from the position shown in Fig. 5, and the two teeth grouped by themselves are upon its upper edge, it is desirable and necessary that the gear D shall be held in this position, so that the mechanism may not be moved by any ordinary shock and the gates thereby become opened while the bridge is turned. I attain this result by a frictional device. (Shown in Fig. 8 in the plan and also shown in section in Fig. 7.) The wheel F is attached firmly to driving-shaft E, and upon its surface, parallel to the position of the two isolated teeth upon gear D, is inserted a smaller frictional wheel V, the position of which is shown in elevation in Fig. 8 and in section in Fig. 7. Directly above this wheel and moving upon suitable guides is a bearer W, so formed as to engage frictionally the friction-wheel V when wheel F is revolving to the position it attains at the opening of the bridge, the spiral spring Y exerting its downward energy upon bearer W with sufficient force to hold the same in position as against any ordinary shock but not sufficiently to prevent its release upon application of the power upon gear D.

Having thus described and shown the elements, combination, construction, operation, and utility of my invention, I therefore claim my invention to be as follows, to wit:

1. The combination, with a turning bridge equipped at its ends with racks, as specified, of the gear D, shaft E, wheel G, pitman H, plate I, wheels M and N, constructed with sheaves upon sides, as specified, bars K and L, cables O, conduits S S and S', sheaves T and T', sheaves U and U', and gates B and B', all constructed and co-operating substantially as specified.

2. A turning bridge constructed with racks at each end, as specified, and a gear driving a horizontal shaft, said shaft operating cables and said cables connected with and operating gates upon the approaches of said bridge, said gear being so placed as to engage said racks, in combination with said horizontal shaft, the wheel F, friction-wheel V, bearer W, and spring Y, as shown and specified.

3. In combination with a bridge, a shaft 2, pinion 3, gear 4, gears 5 and 9, drums 10 and 11, cables 12 and 13, sheaves 14 15 and 18 and 19, sliding rack b, rail c, gear D, and a driving-shaft and mechanism thereto attached, susceptible of operating gates on the several approaches of the bridge, as specified.

4. A swinging bridge equipped with racks, as indicated by b, in combination with gates B, gear D, shaft E, wheel F, friction-wheel V, bearer W, and spring Y, said gates B upon the approaches being operated by power transmitted by shaft E, all substantially as shown and described.

In testimony whereof I have hereunto affixed my signature, in the presence of two subscribing witnesses, at Chicago, Illinois, on this 5th day of April, A. D. 1892.

ANDERS GUSTAF ANDERSON.

Witnesses:
W. KNOX HAYNES,
LARSEN FILSTRUP.